US008820710B2

(12) United States Patent
Bereznai

(10) Patent No.: US 8,820,710 B2
(45) Date of Patent: Sep. 2, 2014

(54) PUSHBUTTON MECHANISM FOR MULTI-MEASURE CONTROLLING A FEEDER VALVE

(75) Inventor: Jozsef Bereznai, Budapest (HU)

(73) Assignee: Bery Intellectual Properties Szellemi Tulajdonjogokat Hasznosito es Kezelo Korlatolt Felelossegu Tarsasag, Budapest (HU)

( * ) Notice: Subject to any disclaimer, the term of this patent is extended or adjusted under 35 U.S.C. 154(b) by 354 days.

(21) Appl. No.: 13/201,949

(22) PCT Filed: Feb. 18, 2010

(86) PCT No.: PCT/HU2010/000018
§ 371 (c)(1), (2), (4) Date: Aug. 17, 2011

(87) PCT Pub. No.: WO2010/094984
PCT Pub. Date: Aug. 26, 2010

(65) Prior Publication Data
US 2011/0297859 A1 Dec. 8, 2011

(30) Foreign Application Priority Data
Feb. 20, 2009 (HU) .................................... 0900102

(51) Int. Cl.
*F16K 1/00* (2006.01)

(52) U.S. Cl.
USPC .......................................... 251/321; 251/285

(58) Field of Classification Search
USPC ................ 251/229, 231, 232, 233, 279, 285, 251/319–321
See application file for complete search history.

(56) References Cited

U.S. PATENT DOCUMENTS 2,304,224 A * 12/1942 Wilcock et al. ............... 137/467
2,773,510 A * 12/1956 Black ....................... 137/614.14

(Continued)

FOREIGN PATENT DOCUMENTS

DE 1927676 U * 11/1965
DE 19729342 2/1999
EP 1768142 3/2011

OTHER PUBLICATIONS

Machine Translation of DE19729342A1 from EPO website (worldwide.espacenet.com) on Sep. 23, 2013.*

(Continued)

*Primary Examiner* — John K Fristoe, Jr.
*Assistant Examiner* — Jessica Cahill
(74) *Attorney, Agent, or Firm* — Birch, Stewart, Kolasch & Birch, LLP

(57) ABSTRACT

The pushbutton mechanism comprises a lower part (1) and a cover (2) which are connected to each other and together constitute a house; a push bar (3) being in contact with the cover (2) and passing through an opening (5) in the lower part (1) and protruding out from that; an activation surface being on the cover (2); a biasing spring (4) between the cover (2) and the lower part (1) providing mechanic bias at the initial position of the pushbutton mechanism; and the cover (2) is able to move from its initial position when approaching relatively to the lower part (1) in response to an external pressing force. The cover (2) is formed as a single piece and is attached to the lower part (1) so that it is movable to an angled position compared to its initial position, the angled position of the cover (2) and thus that part of the displaced push bar (3) protruding out of the lower part (1) is depending on the point of exertion the pressing force within the activation surface.

16 Claims, 3 Drawing Sheets

(56) References Cited

U.S. PATENT DOCUMENTS

Figure 1:
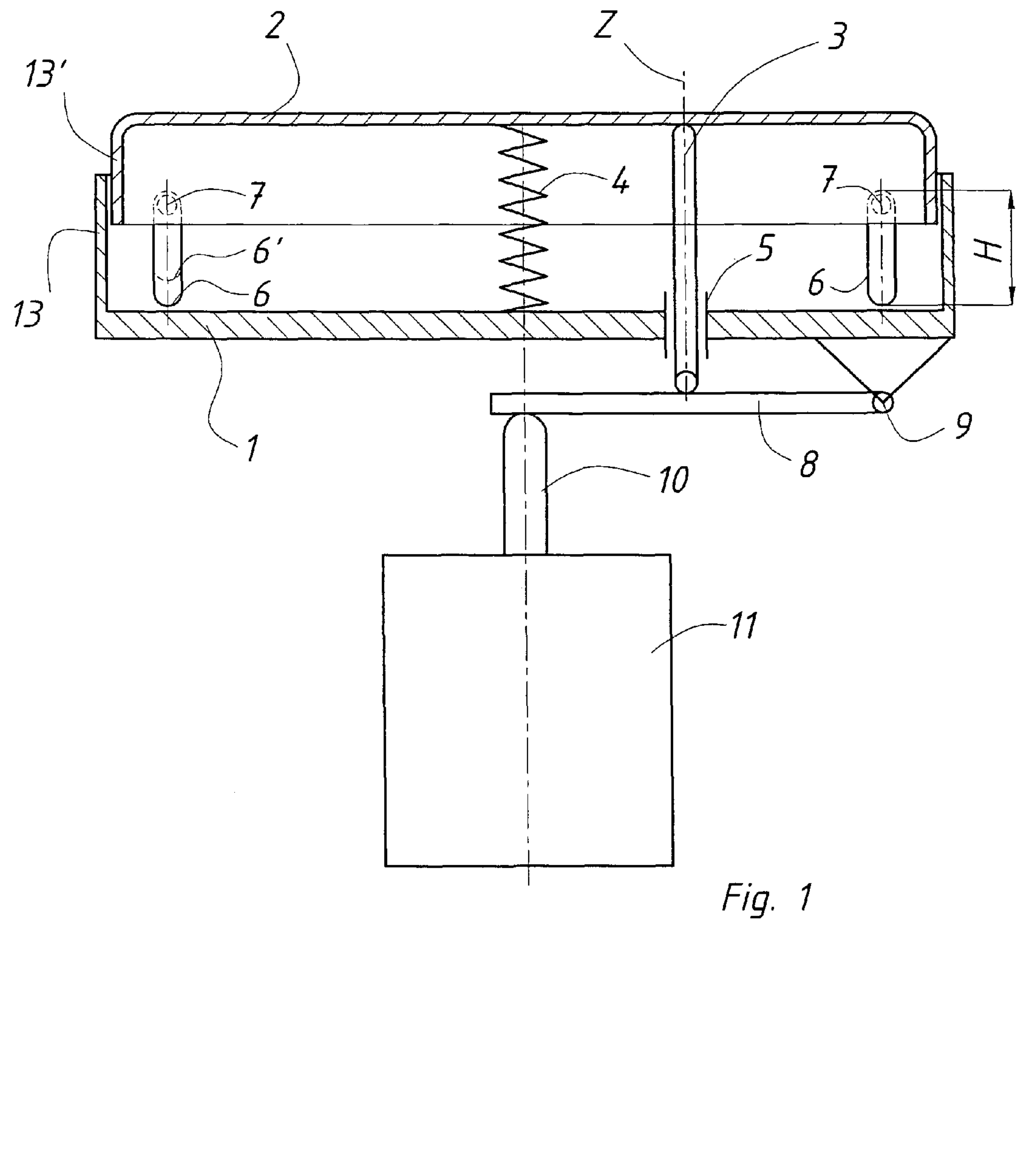

| | | | | | |
|---|---|---|---|---|---|
| 2,899,169 | A | * | 8/1959 | Klingler | 251/107 |
| 2,909,936 | A | * | 10/1959 | Huthsing, Sr. et al. | 74/102 |
| 3,055,630 | A | * | 9/1962 | Becker | 251/45 |
| 3,565,089 | A | * | 2/1971 | Thompson | 137/68.16 |
| 3,735,076 | A | | 5/1973 | Iijima | |
| 3,756,557 | A | * | 9/1973 | Katva | 251/45 |
| 3,779,283 | A | * | 12/1973 | Hohulin | 137/637 |
| 4,375,179 | A | * | 3/1983 | Schwartz et al. | 84/439 |
| 6,296,011 | B1 | * | 10/2001 | Esche et al. | 137/355.25 |
| 6,691,937 | B2 | * | 2/2004 | Heren et al. | 239/570 |
| 6,935,536 | B2 | * | 8/2005 | Tardif | 222/153.14 |
| 2005/0236600 | A1 | | 10/2005 | Chien et al. | |
| 2006/0266633 | A1 | | 11/2006 | Shibata et al. | |

OTHER PUBLICATIONS

Machine Translation of DE1927676U from EPO website (Jan. 17, 2014).*

* cited by examiner

PUSHBUTTON MECHANISM FOR MULTI-MEASURE CONTROLLING A FEEDER VALVE

This application is the National Phase Under 35 U.S.C. §371 of PCT International Application No. PCT/HU2010/000018 which has an International filing date of Feb. 18, 2010, which claims priority to Hungarian Patent Application No, P0900102 filed on Feb. 20, 2009. The entire contents of all applications listed above are hereby incorporated by reference.

Subject of the invention is a pushbutton mechanism for multi-measure controlling feeder valves. The structure comprises a lower part and a cover which are connected to each other and together constitute a house; a push bar being in contact with the cover and passing through an opening in the lower part and protruding out from that; an activation surface being on the cover; a biasing spring between the cover and the lower part providing mechanic bias at the initial position of the pushbutton mechanism; and the cover is able to move from its initial position when approaching relatively to the lower part in response to an external pressing force.

It is known that in liquid dosing technology feeder valves can be applied that have one valve stem, and the extent of axial impression of this valve stem determines the amount of liquid to be dosed. The present application describes such a valve type e.g. in the international patent application published under WO 03/0031850. For providing control of such valves, an arrangement can be applied that changes the extent of maximal possible axial displacement of its valve control plunger depending on the measure of turning-off. For this purpose we can cite as an example published Hungarian patent application P0400503. A further possibility would be that we apply different pushbuttons and valves assigned to various dosage extents, or if necessary, different pushbuttons assigned to a single valve, but using one intermediate mechanism. However, any of these would significantly increase the cost of the construction.

The prior disclosure of DE 197 29 342 A1 is an electric switch includes an actuator which acts on a movable contact and covers the base surface of the switch. The switch has a socket, containing the movable contact, and carrying a support plate with a switching element. At a rest position the actuator is parallel to the support plate. In the rest position the actuator is spaced from the support plate in a pushbutton manner with at least one-sided play. Springs are provided holding the actuator in its rest position. To the support plate are secured several triangular holding eyelets, engaged by pins on the actuator. This invention is relating to an electric switch which serves an electric on/off switching, but not capable to serve multi-measure controlling a feeder valve. There is also not any possibility to select control by different location of pressure on the outside cover of the switching means.

It is an object of the present invention is to establish such a simple, compact pushbutton mechanism that is suitable for allowing several dosages of different amount for dosing feeder valves described earlier. Further it was an object to simplify manufacturing, mounting and maintaining by use of a single piece button cover.

It was recognised that by building into a single house, an asymmetrically arranged pushbutton can be created for this object which is based on the principle of a single-arm lever with variable centre of rotation. At such a construction, expediently a bigger pushbutton surface can be formed, in case of pressing in well-definable areas of which, liquid dosing of different measures can be achieved.

The invention in its most general form is a construction according to the opening paragraph, wherein the cover is formed as a single piece and is attached to the lower part so that it is movable to angled positions compared to its initial position, the push bar is in an asymmetric arrangement in relation to the biasing spring, and the actual angled position of the cover and thus that part of the displaced push bar protruding out of the lower part is depending on the point of exertion the pressing force within the activation surface.

Figure 2A:
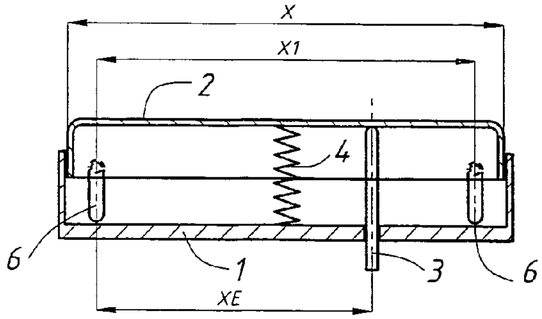
Figure 2B:
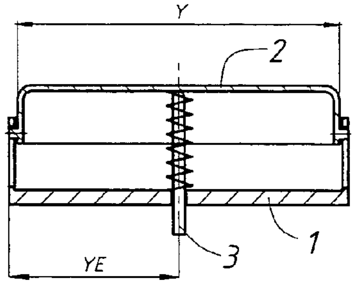
Figure 3A:
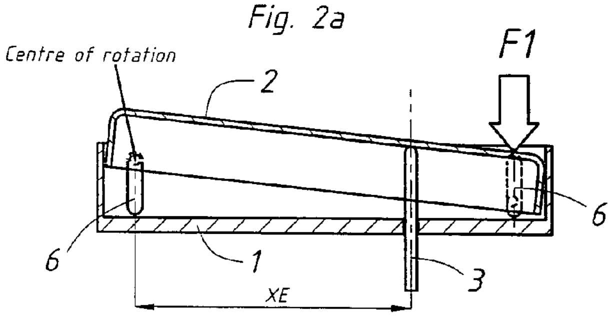
Figure 3B:
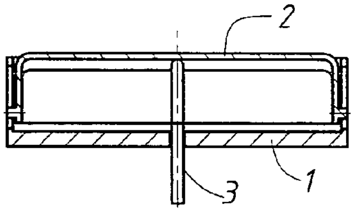
Figure 4A:
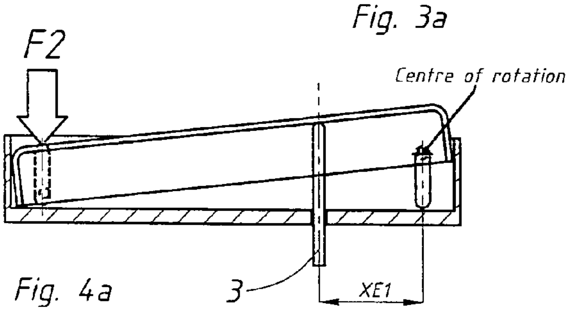
Figure 4B:
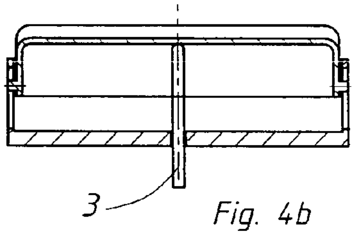
Figure 5A:
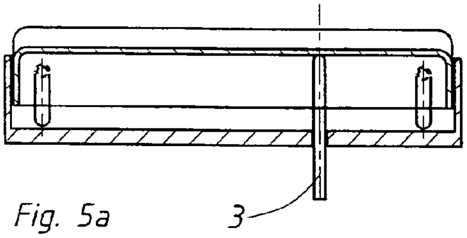
Figure 5B:
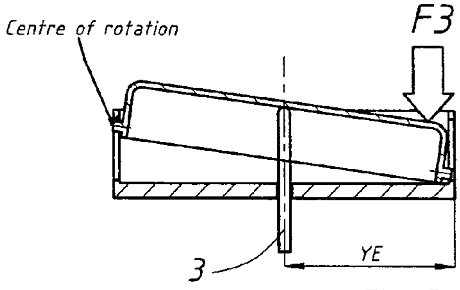
Figure 6A:
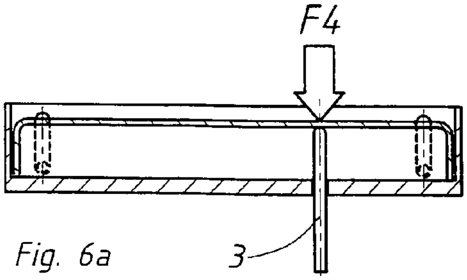
Figure 6B:
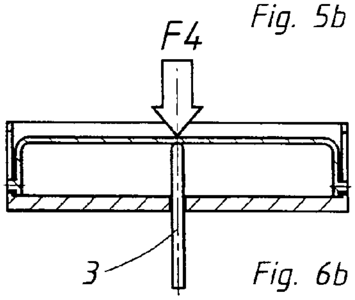
Figure 7:
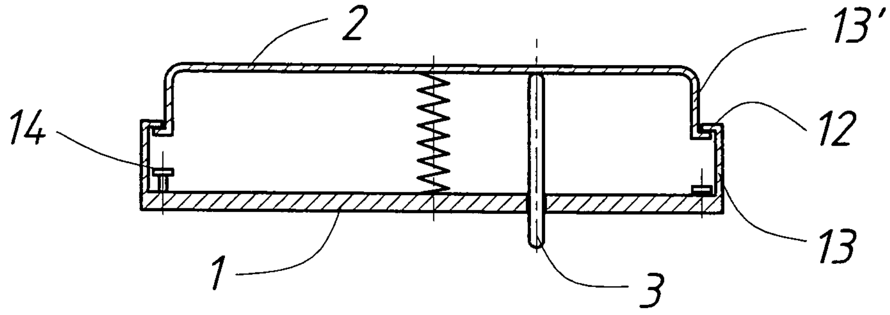
Figure 8:
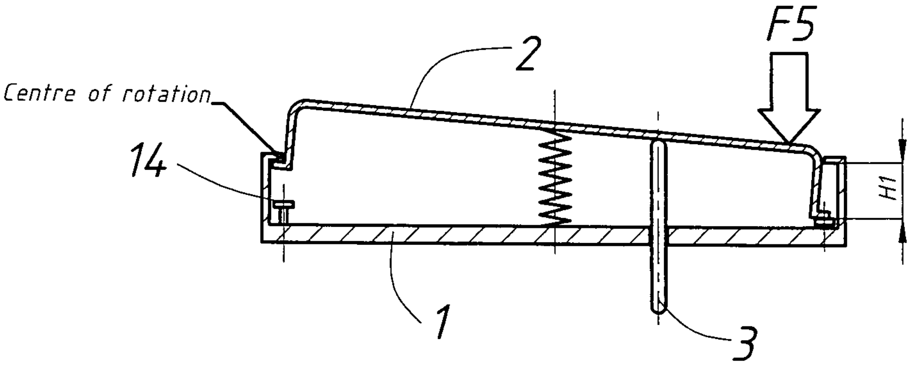

Further we describe the invention by referring to drawings, where in FIG. 1 main structural components of a possible embodiment of the present the invention forming a pushbutton and a feeder valve that is controllable by that are shown in cross-section, in FIGS. 2*a* and 2*b* a pushbutton according to FIG. 1 is shown in its longitudinal and transversal cross-sectional views, in FIGS. 3*a* and 3*b* a pushbutton according to FIGS. 2*a* and 2*b* is shown, in a first activation position, in FIGS. 4*a* and 4*b* a pushbutton according to FIGS. 2*a* and 2*b* is shown, in a second activation position, in FIGS. 5*a* and 5*b* a pushbutton according to FIGS. 2*a* and 2*b* is shown, in a third activation position, in FIGS. 6*a* and 6*b* a pushbutton according to FIGS. 2*a* and 2*b* is shown, in a fourth activation position, in FIG. 7 a further possible embodiment of pushbutton is shown in cross view, in FIG. 8 the pushbutton according to FIG. 7 is shown in its activated position.

FIG. 1 shows a cross view of a possible and preferable embodiment of a pushbutton mechanism according to the present invention. A lower part 1 and a cover 2 are main structural parts of the pushbutton, they together constitute a house. The single piece cover 2 has a relatively large activation surface, in FIG. 1 this is a part of the upper plane extending orthogonally to the plane of drawing, and can move from its initial position in response to an external force (pushing, pressing) on the activation surface. As it will be shown later, this movement may be such that it arrives at an angled position—compared to its initial position—in the direction depending on the location of the point of exertion the pressing force and this represents the controlling basis for dosage or supply of different liquid measures by a feeder valve.

Through an opening 5 formed in the lower part 1, a push bar 3 is passing through in the direction orthogonal to the lower part 1 and to the main sheet of the cover 2 in initial position, in the direction of a corresponding axis Z. The push bar 3 is in contact with the cover 2, fitted to its lower internal surface by abutting, however, it can freely move through the opening 5 of the lower part 1. In an embodiment the cover 2 asymmetrically contacts the push bar 3 at the point different from the centre of the cover 2 or its activation surface.

The lower part 1 and the cover 2 in initial position, that is without activating by pushing, are in the most distant possible position relative to each other, this is provided by a biased spring 4, which is arranged between the lower part 1 and the cover 2 symmetrically, at about the centre point of the cover 2. Of course, several similar or other type springs can also be placed in a single pushbutton. The mentioned maximum distance and keeping the pushbutton together against spreading force of the biased coil type spring 4 are provided by a pin-groove fitted coupling. According to this, two practically rectangular side walls 13 of the lower part 1—that is orthogonal to the lower part of the activation surface of the cover 2—bear four longitudinal grooves 6 of a given length H, extending parallel with the axis Z. The grooves 6 are elongated holes formed in two longitudinal opposite side walls 13 of the rectangular lower part 1, two grooves 6 in each side wall 13, that is altogether four ones. Pins 7 fitting in grooves 6 are formed on the cover 2, on its corresponding opposite side walls 13'. The pins 7, engaging with grooves 6, are protruding out from the side walls 13' that is orthogonal to the practically rectangular main activation surface area of the pushbutton. This structure during assembling can be built together for example in flexibly snapping way. The pins 7 can freely move along the length H of the groove 6—here we ignore shortening derived from the diameters of pins 7, or we can deduct this contraction factor from the length H of grooves 6.

The cover 2 is able to move from its initial position, approaching relatively toward the fixed lower part 1 in response to an external pressing force. Since the cover 2 is formed as a single piece, it will move to an angled position compared to its initial position. The direction of the cover 2 in this angled position depends on the point of exertion the pressing force within the activation surface, i.e. its relation to the location of the biased spring 4, and also the abutting position of the bottom edge of displacing side wall(s) 13' of the cover 2. The abutting is taken place on the inner surface geometry of the lower part 1. For example in the embodiment of FIG. 1 the abutting is uniform in case of using groves 6 of the uniform length H and height in the side walls 13, but it can be limited in case shorter groves 6' (dotted lower end) are applied on one side—or those ones are positioned higher in the side walls 13. In this case the angled position is differently angled in different directions. Differently positioned arrangement of engaging grooves 6 or 6' and pins 7 may also define the abutting position. This result that the cover 2 is movable to its angled position only, which is limited by an abutting position in which the lower part 1 and the cover 2 are abutted at least on one side.

The connection between the push bar 3 and the cover 2 can be a hinged connection, or due to counterforce acting onto the lower end of the push bar 3 it can be automatically provided. In case of the present construction, the controlling mechanic movement is forwarded by the push bar 3, not directly to a valve, but using power transmission means 8—in case of the present embodiment a bar that operates as a single-arm lever—fixed on a swivel-pin 9. Using the power transmission means 8, a valve shaft 10 of a feeder valve 11, fastened in fixed position relatively to the lower part 1, can move down parallel to the axis Z, if we activate the described pushbutton mechanism in any possible way. Alternatively the push bar 3 may be the same or may drive directly the valve shaft or any other valve control plunger of a feeder valve.

The elongated grooves 6 on the lower part 1 and the fitting pins 7 on the cover 2 can be changed between each other.

In FIG. 2 a simplified cross section of a pushbutton mechanism is shown with main structural components corresponding to the previously described one included in FIG. 1. Here we indicated only those components which are essential for activating. FIG. 2*a* is a cross section taken parallel with the longer side of length X of the rectangular pushbutton, while FIG. 2*b* is a cross section taken parallel with the shorter side of length Y. In FIG. 2*a* we have indicated furthermore the effective length XE between the centre line of the groove 6 and the push bar 3, as well as the actual length X1.

FIG. 3*a* is a construction of FIG. 2*a* when activation by pressing force F1 effects on the cover 2 at the point marked by the arrow. (We note that here and further not the absolute value of any pressing force Fi has been symbolised by an arrow but the point of exertion.) We assume that this is performed according to FIG. 3*b* in the centre line regarding the shorter side. Then the pin 7 that is supported in the upper end of the left-side groove 6 constitutes a centre of rotation, while due to the right-side groove 6 the cover 2 can move to its lower end. This practically means a displacement of length H in respect of the right-side groove 6. It can be seen that downward displacement of the push bar 3 in this case will be of the product value H(XE/X1).

In case of FIG. 4*a* pressing force F2 exerted onto the pushbutton in initial position near to the left-side groove 6, in the central position taken at the shorter side according to FIG. 4*b*. Similarly, it can be seen that downward displacement of the push bar 3 will be of the product value H(XE/X1).

FIG. 5*a* and FIG. 5*b* show an activation place or position by pressing force F3, wherein the pushbutton according to the invention is pushed according to the longitudinal direction of length X at the centre, but according to the direction of the shorter width Y at the edge of the cover 2. Similarly, we get the result that by considering the position of the centre of rotation, the extent of downward displacement of the push bar 3 will be H(Y/YE), wherein the width YE is the distance of the centre of the push bar 3 and the edge of the cover 2.

Finally, as a last activation position shown in FIG. 6*a* and FIG. 6*b* where pressing force F4 effects onto the cover 2 just at the place corresponding to the contact spot of the push bar 3 with the cover 2. Then the latter can displace completely, that is in all four grooves 6 towards the lower part 1, thereby we evoke at the push bar 3 a maximal downward displacement that is of the length H. It is to be noted that depending on mutual position of the spring 4 and push bar 3, on a section that may exist between them, any arising pressing force on the cover 2 will cause similar effect.

The invention makes possible not only two different measures by left or right side pressing the cover 2 in X direction, as indicated in FIG. 2*a*-6*a*, but the rectangular cover 2 allows two further different measures in Y direction as well, according to FIG. 2*b*-6*b*. This is due to the relocation of actual centre of rotation. The optional fifth (maximal) measure control can be reached by pressing at the spring 4, as it can be seen in FIG. 6*b*.

In FIG. 7 a further possible embodiment of the pushbutton construction according to FIG. 1 is shown. Here the difference compared to FIG. 1 is that relative movement between the lower part 1 and the cover 2 is provided not by grooves and pins but by such edge rim arrangement 12 that runs around on both parts, on their side walls 13 and 13', which limits maximum displacement between the mentioned parts. In FIG. 8 we can see that by exertion of a pressing force F5 with asymmetric position a displacement of length H1 can be achieved at the right-side edge of the cover 2, which will move the push bar 3 downward according to the principle already disclosed. Here the centre of rotation is the part of the edge rim arrangement 12 at the side opposite to where the pressing force F5 effects. Pushing the cover 2 of FIGS. 7 and 8 on the left side that will displace until reaching an arrester 14, which is a less displacement than length H1. This would result asymmetric displacement on the push bar 3 even in case that is placed in the centre. The arrester 14, either in the lower part 1 or in the cover 2, is preferably at least one bolt or screw having the option of adjustable abutting position. This is an alternative way to provide push spot depending multiple-measure control by a single piece cover and a push bar. The asymmetric positioned push bar and the asymmetric abutting position can be used alternatively or combined, since both are based on the same single-arm lever principle. In other words the direction or the angle of the angled position of the cover is influenced by spot depending press.

The described embodiment of the above pushbutton arrangement in top-view is rectangular, but different forms can also be possible. Thus, for example, a circular, oval, triangular or polygonal activation surface may also be applicable.

As the pressing forces F1-F5 described as examples—those differ not necessarily in value but in their position—can be applied on such place of the cover 2 where a given, preset displacement can be achieved on the push bar 3, thereby we obtain mechanic control for supplying a given volume of liquid. These spots, where one must apply the dynamic effect (press) on the cover 2, can be marked thereby a simple and clear guide can be provided. For example numbers 3, 6, 9 on the cover of a WC pushbutton can indicate liters of rinsing water initiated by pressing the corresponding spot of the pushbutton. It can be understood that different intermediate volumes of a liquid may also be supplied in case of choosing intermediate spots, points on the activation surface which, for example, in household applications can be established empirically by the user.

The pushbutton mechanism according to the invention can be mounted onto walls, built into walls, or applied to any other nearly plane surfaces. Instead of the exemplary power transmission 8 according to the FIG. 1 the feeder valve 11 can be driven directly, or any other known drive ratio—that is proportional with the push bar displacement—can be used.

Keeping in mind the principle of the invention, several variations and modifications can be used Thus, for example, the push bar 3 is not necessarily orthogonal to the cover 2 or to its activation surface. Moreover, the activation surface may be not plane, e.g. partially or completely convex or concave. Flexible joint of the cover 2 and of the lower part 1 can also be used in a known manner not shown here.

A pushbutton according to the present invention may serve several functions (different in liquid volume), yet comprises a single piece cover, which involves manufacturing and further economic advantages, both in respect of easier installation and less maintenance need.

The invention claimed is:

1. A pushbutton mechanism for multi-measure controlling a feeder valve, the mechanism comprising:

- a lower part and a cover which are connected to each other and together to form a housing;
- a push bar being in contact with the cover and passing through an opening in the lower part and protruding out from the lower part, said opening being spaced from a center of the lower part;
- an activation surface being on the cover; and
- a biasing spring between the cover and the lower part providing mechanic bias at the initial position of the pushbutton mechanism,
- wherein the cover is able to move from its initial position when approaching relatively to the lower part in response to an external pressing force,
- wherein the cover is formed as a single piece and is attached to the lower part so that it is movable to angled positions compared to its initial position,
- wherein the push bar is in an asymmetric arrangement in relation to the biasing spring, and
- wherein the actual angled position of the cover and thus that part of the displaced push bar protruding out of the lower part depends on the point of exertion of the pressing force on the activation surface.

2. The pushbutton mechanism according to claim 1, wherein the lower part and the cover are connected to each other by engaging grooves and pins formed in the side walls of the lower part and the cover respectively.

3. The pushbutton mechanism according to claim 1, wherein the lower part and the cover are connected to each other by a common edge rim arrangement formed on the side walls of the lower part and the cover respectively.

4. The pushbutton mechanism according to claim 1, wherein the activation surface of the cover is rectangular.

5. The pushbutton mechanism according to claim 1, wherein the activation surface of the cover is circular, oval, triangular or polygonal.

6. The pushbutton mechanism according to claim 1, further comprising:

- a first sidewall extending upwardly from the lower part;
- a first flange extending inwardly from the first sidewall;
- a second sidewall extending downwardly from the cover part;
- a second flange extending outwardly from the second sidewall,
- wherein the first flange engages the second flange to limit upward movement of the cover.

7. The pushbutton mechanism according to claim 1, wherein the push bar contacts the cover eccentrically.

8. The pushbutton mechanism according to claim 1, further comprising a lever under the lower part, the lever pivotally relative to the lower part,

- wherein the push bar engages the lever upon downward movement of the cover.

9. The pushbutton mechanism according to claim 1, wherein the cover has a variable axis of rotation depending on the point of exertion of the pressing force on the activation surface.

10. The pushbutton mechanism according to claim 1, wherein the cover is moveable to its angled position limited by an abutting position in which the lower part and the cover are abutted at least one side.

11. The pushbutton mechanism according to claim 10, wherein the abutting position is determined by the engaging grooves and pins.

12. The pushbutton mechanism according to claim 10, wherein the abutting position is determined by at least one arrester.

13. The pushbutton mechanism according to claim 10, wherein the abutting position is determined by at least one arrester that is a bolt or screw for adjustable abutting position.

14. The pushbutton mechanism according to claim 1, wherein the cover is in contact with the push bar asymmetrically, at a point different from the centre point of the cover.

15. The pushbutton mechanism according to claim 1 or 14, wherein the biasing spring between the lower part and the cover is arranged symmetrically at the centre point of the cover.

16. The pushbutton mechanism according to claim 15, wherein the push bar contacts the cover eccentrically.

* * * * *